United States Patent [19]
Eckberg, Jr. et al.

[11] Patent Number: 4,769,811
[45] Date of Patent: Sep. 6, 1988

[54] PACKET SWITCHING SYSTEM ARRANGED FOR CONGESTION CONTROL

[76] Inventors: Adrian E. Eckberg, Jr., Holmdel; Daniel T. Luan, East Brunswick; David M. Lucantoni, Eatontown; Tibor J. Schonfeld, Livingston, all of N.J.

[73] Assignee: American Telephone and Telegraph Company, AT&T Bell Laboratories, Murray Hill, N.J.

[21] Appl. No.: 948,152

[22] Filed: Dec. 31, 1986

[51] Int. Cl.[4] .............................................. H04J 3/26
[52] U.S. Cl. ........................................ 370/60; 370/94
[58] Field of Search ............................ 370/79, 60, 94; 340/825.5

[56] References Cited

U.S. PATENT DOCUMENTS

| | | | |
|---|---|---|---|
| 4,484,326 | 11/1984 | Turner | 370/60 |
| 4,566,095 | 1/1986 | Devault et al. | 370/94 |
| 4,616,359 | 10/1986 | Fontenot | 370/60 |
| 4,630,259 | 12/1986 | Larson et al. | 370/60 |
| 4,630,261 | 12/1986 | Irvin | 340/825.5 |
| 4,646,287 | 2/1987 | Larson et al. | 370/60 |
| 4,679,190 | 7/1987 | Dias et al. | 370/60 |
| 4,703,477 | 10/1987 | Adelmann et al. | 370/94 |

FOREIGN PATENT DOCUMENTS 0177761 9/1985 Japan ..................................... 370/60

OTHER PUBLICATIONS

*Flow Control in Computer Networks,* "Experiments in Congestion Control Techniques", J. C. Majithia, M. Irland, J. L. Grange, N. Cohen and C. O'Donnell, 1979, pp. 211–234.
*IEEE Transactions on Communications,* vol. Com-28, No. 4, Apr. 1980, M. Gerla et al., "Flow Control: A Comparative Survey", pp. 553–574.
*IEEE Communication Magazine,* vol. 24, No. 10, Oct. 1986, J. S. Turner, "New Directions in Communications (or Which Way to the Information Age)", pp. 8–15.

*Primary Examiner*—Douglas W. Olms
*Assistant Examiner*—Melvin Marcelo
*Attorney, Agent, or Firm*—Richard B. Havill

[57] ABSTRACT

A method for controlling congestion in a packet switching network uses a packet dropping algorithm to determine when to drop a marked packet wherever the network is congested at any point along the path being traversed by the marked packet.

21 Claims, 8 Drawing Sheets

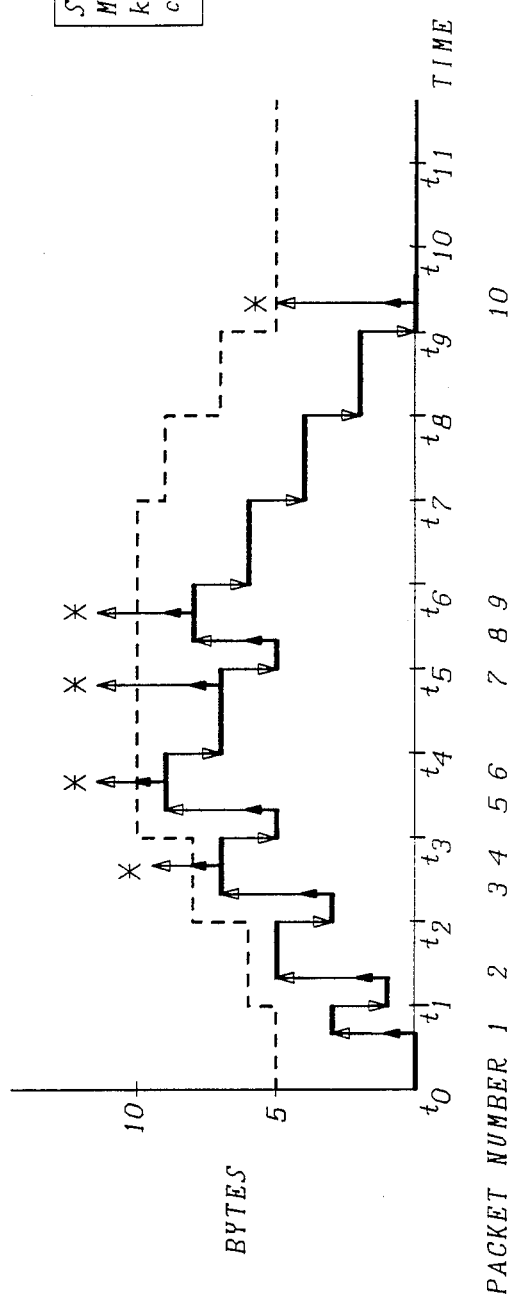

PACKET SWITCHING SYSTEM ARRANGED FOR CONGESTION CONTROL

TECHNICAL FIELD

This invention relates to a packet switching system arranged for controlling switch node and link congestion caused by customers transmitting information at excessive rates.

BACKGROUND OF THE INVENTION

Packet communication involves a technique of disassembling information at the sending end of a switching network for insertion into separate bursts, or packets, of data and reassembling the same information from the data packets at the receiving end of the network. Communication according to this technique is especially useful in common carrier or time-shared switching systems, since the communication path or circuit required for the packet transmissions is needed only while each packet is being forwarded through the network, and is, therefore, available to other users during intervening periods.

Packet switching offers another attractive feature. That is the flexibility of providing integrated information transport services for a wide range of applications, e.g., interactive data, bulk data, signaling, packetized voice, image, etc. Instead of designing specialized networks optimized for specific forms of applications, many services can be simultaneously operated over the same connection to the network. All varieties of user information are converted into packets, and the network transports these packets between users. End users are not tied to fixed rate connections. Instead, network connections adapt to the particular needs of the end user. Furthermore, it is possible to create a uniform user-network interface applicable to a broad range of services. Note that different applications may require different grades of service from the network. For example, packetized voice transmission has very stringent delay requirements for delivery of associated packets of an ongoing conversation.

Efficient utilization of network resources can be attained by allowing packetized transmissions of a plurality of users on the same connection on a time-shared basis. Thus the packets of one user are interspersed with the packets of other users.

Elements of the resources or facilities which may be shared in such packet networks include transmission link bandwidth (defined as bytes/sec, a measure of link capacity), processor real time (i.e., time immediately available for processing packets), ports or links, and data or packet buffers. In large multinode networks, each node or packet switch accommodates many such ports or links that terminate paths which extend to users' terminal equipments or to other nodes. Each node may include one or more processors for controlling the routing and processing of packets through the node. The node is customarily equipped with a large number of buffers for storing packets prior to such routing or while awaiting an output link. Each line between nodes or extending to users typically serves a plurality of concurrent calls between different terminal equipments. Each packet passing through the network consumes a certain amount of processor real time at each node, takes away a certain amount of link capacity (proportional to the packet size), and occupies buffers while being processed. There is a maximal number of packets per unit of time that a network can accommodate. This notion of "capacity" depends on all the aforementioned resources provisioned within the network, as well as on the particular traffic mix generated by the users.

One problem in a packet switching system arises when many users attempt to utilize the network at the same time. This results in the formation of many paths or circuits for routing the packets and the congestion of the communication facilities. Congestion of a facility is the occurrence of more work than can be handled by the facility in a specific period of time. It has been found that congestion tends to spread through the network if the congestion is uncontrolled. As a result, it is desirable to have a flow/congestion control mechanism for protecting the expected performance level for each service type (e.g., voice) from unpredictable traffic overloads due to other service types. Protection from overload can be provided through the allocation of key network resources. In the event that a key resource is overloaded by traffic, it is desirable that the overall performance of the system should degrade as gracefully as possible. Controlling the utilization of the key resource may require different objectives under the overload condition than under a normal load condition.

A principal area of packet congestion is in buffers, or queues, in each node, particularly where the buffers become unavailable to store incoming packets. Yet the buffer requirement is closely related to the utilization of processor real time and/or link bandwidth. When the processor real time is exhausting, or when the link bandwidth is not sufficient to handle the packet traffic, queues within the switching node will build up causing a long delay. Finally packet buffers will be exhausted, resulting in the dropping of packets. A number of flow control procedures, e.g., end-to-end windowing, have been developed and commercially exploited for controlling congestion.

The known end-to-end windowing scheme for flow control is advantageous when network operation is viewed strictly from the network periphery. Each machine can have many logical channels simultaneously established between itself and various other machines. For each of these logical channels, a given machine is allowed to have W unacknowledged packets outstanding in the network. For example, a machine can initially transmit W packets into the network as fast as it desires; but, thereafter, it must wait until it has received an acknowledgment from the destination machine for at least one of those outstanding packets before it can transmit more packets.

This scheme has several very desirable properties. There is very little wasted link bandwidth caused by the flow-controlling mechanism because the number of bits in an acknowledgment can be made very small compared to the number of bits in the W packets to which it refers. There is an automatic throttling of transmission under a heavy load condition because the increased round-trip delay will slow down the acknowledgments and hence the traffic source.

There also are disadvantages to the end-to-end window flow control. The windowing mechanism by itself is not robust enough. The mechanism relies upon the end user adhering to an agreed-upon window size. By unilaterally increasing its window size, an abusive user can get favorable performance while degrading the performance for other users. Even if all users obey their specified end-to-end window sizes, it is very difficult to determine suitable window sizes for various load conditions. In general, the window size W is chosen large enough to allow uninterrupted transmission when the network is lightly loaded; however, overload conditions may require an unacceptably large amount of buffer storage within the packet switch. It is possible for end users to adaptively adjust their window sizes based on network congestion, but this by itself would not necessarily give a fair congestion control.

Another drawback to relying upon the end-to-end windowing mechanism is that not all agreed-upon user applications are subject to window-based end-to-end control. For example, the Unnumbered Information (UI) transfer embedded in some window-based protocols, e.g, LAPD, allows the end users to send packets without any windowing limitation. Other examples are packetized voice or packetized voice-band data applications where an end-to-end window is not applicable.

It has been proposed that in an integrated voice or data packet network the proper way to control flow or congestion is by allocating bandwidth to connections and by making new connections only when the needed bandwidth is available.

This means that the network must provide a mechanism for users to select their bandwidth needs and indicate the burstiness of their transmissions. Thereafter, the network must enforce those parameters with respect to the respective users.

A key part of bandwidth allocation is the mechanism used to select and specify the needed bandwidth and to limit users to their selections. Perhaps the simplest approach is the so-called "leaky bucket" method. A count in a counter, associated with each user terminal transmitting on a connection, is incremented whenever the user sends a packet and is decremented periodically. The user selects the rate at which the count is decremented (this determines the average bandwidth) and the value of a threshold (a number indicating burstiness). If the count exceeds the threshold upon being incremented, the network discards that packet.

There are problems with this "leaky bucket" bandwidth allocation proposal. A major problem is the fact that the control is open-loop in nature. A user's packets will be dropped once the threshold is exceeded even when the network could have handled the packets. Precious network resources would be wasted. The unnecessary throttling of that user's data may sustain the information transfer over a lengthy period, contributing to network congestion at a later time. Another problem is that the limiting network resource may be processor real time rather than link bandwidth.

SUMMARY OF THE INVENTION

These and other problems are resolved by a novel method and apparatus for controlling congestion in a packet switching network. The method uses a packet dropping algorithm to determine when to drop marked packets being transmitted through the network. Marked packets are dropped wherever the network is congested at any point along the path being traversed by the data packets.

A copending patent application defining the method utilized for monitoring and marketing packets has been filed concurrently herewith in the names of A. E. Eckberg, Jr.-D. T. Luan-D. M Lucantoni-T. J. Schonfeld Case 1-1-1-1, Ser. No. 948,151.

BRIEF DESCRIPTION OF THE DRAWINGS

The invention may be better understood by reading the following detailed description with reference to the drawings wherein

FIG. 9 is a graphic illustration of the actions of the algorithms shown in FIGS. 4 and 8 for a sequence of packets from a customer.

DETAILED DESCRIPTION

Figure 1:
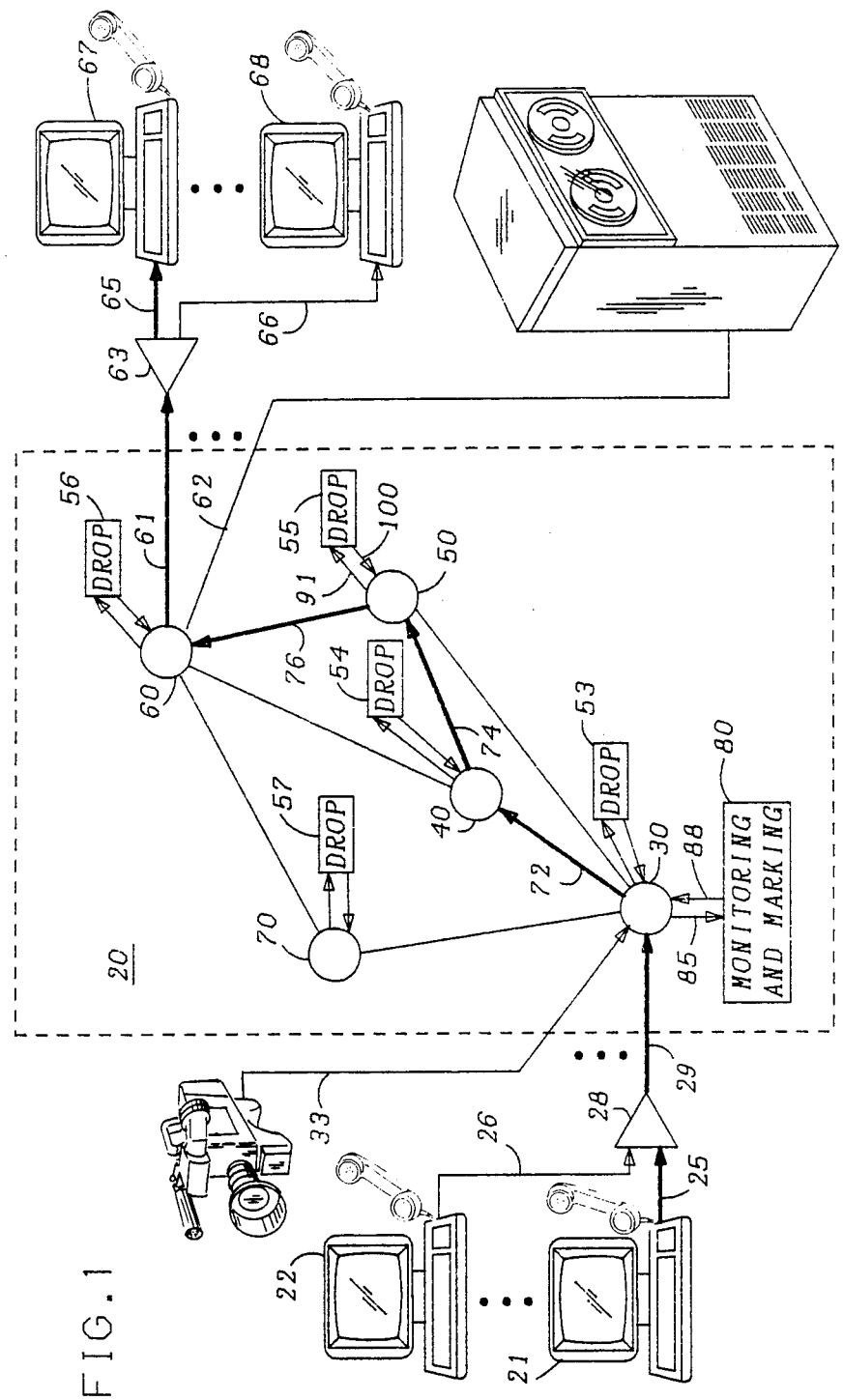
FIG. 1 illustrates a packet switching network arranged for interconnecting voice/data/video terminals and controlling congestion within the network.

Referring now to FIG. 1, there is shown a packet switching network 20 that is arranged for establishing virtual circuit connections between pairs of terminal equipments. Terminals 21 and 22 transmit packets of data through customer connection lines 25 and 26 to a packet multiplexer 28. Other terminals, not shown in FIG. 1 but indicated by a series of dots, also can transmit packets of data into the multiplexer 28. Although the terminals 21 and 22 are shown as computer terminals, they also may be digitized voice, video, or other data terminals. A resulting output stream of packets, interspersed with one another, are transmitted from the multiplexer 28 over an access line 29 to an access node 30 in the packet switching network 20. Another access line 33, and other access lines represented by a series of dots, also transmit streams of data packets into the access node 30. Some of these access lines originate at multiplexer and others originate at high speed terminal equipments.

Although a typical packet switching network may be a very complex network of switch nodes and links, only five switch nodes 30, 40, 50, 60 and 70 are shown in FIG. 1 to illustrate an arrangement of the invention.

In FIG. 1 only node 30 is arranged as an access node for receiving packets from customers' terminal equipments. Any or all of the other nodes 40, 50, 60 or 70 may also be access nodes in an operating system, but are not shown as access nodes in the network 20 merely to simplify the drawing.

Node 60 is shown as an egress node in FIG. 1. The other nodes also may be egress nodes but are not shown as such in FIG. 1 to simplify the drawing. From the egress node 60, streams of packets are transmitted over egress lines 61 and 62 and others, represented by a series of dots, to demultiplexers or customers' equipments. For purposes of simplification of FIG. 1, only a single demultiplexer 63 is shown. The stream of data packets transmitted over the egress line 61 is separated within the demultiplexer 63 according to customer identity so that customer specific packets are passed over customer connection lines 65 and 66, respectively, to customer terminals 67 and 68. Other customer lines and terminals also are supplied with streams of packets from the demultiplexer 63. Those other customer lines and terminals are represented in FIG. 1 by a series of dots.

For purposes of illustrating the operation of the data switching network 20, an exemplary virtual connection is shown by a heavily weighed path line linking the terminal equipment 21 to the terminal equipment 67. Although typical transmission is two-way over such a virtual connection, only one-way transmission from the terminal equipment 21 through the network 20 to the terminal equipment 67 is shown in FIG. 1. This virtual circuit connection is established from the multiplexer 28 and access line 29 through the access node 30, switch nodes 40 and 50, links 72, 74 and 76, egress node 60, and egress link 61 to the demultiplexer 63.

The network 20 is arranged for congestion control. Links and switches are provisioned in quantities that permit unimpeded transmission of all packets up to a limit. Congestion, which potentially might occur at any point within the network 20, can impede the progress of a growing number of packets if the congestion continues for an extended period of time. As a result, the congestion can spread throughout the network and disable the network from effective operation.

The advantageous congestion control scheme, herein presented, is directed toward monitoring and marking selected customer data packets and eliminating or dropping from further transmission through the network marked data packets whenever and wherever they encounter a congestion condition. This control scheme is implemented by algorithms which affect individual data packets at various times and points within the network as a continuing stream of packets progresses through the virtual connection. Each customer or end user may establish multiple virtual connections to different customers of the network. The monitoring and marking scheme can be implemented on a per virtual circuit basis, on a per group of virtual circuits basis, or on a per customer basis. To simplify further explanation, we assume there is only one virtual circuit per customer, so the terms customer and virtual circuit will be synonymous hereinafter.

A first algorithm is for monitoring the bandwidth of a customer and for marking that customer's packets when that customer's subscribed bandwidth is exceeded. In this context, bandwidth may be defined as a two-dimensional quantity in the units (bytes/sec, packets/sec) to distinguish between whether link bandwidth or processor real time is the limiting resource. The subscribed bandwidth is described in terms of an average rate (a throughput in bytes/sec that is guaranteed to be achievable by the user with packets of a specified size) and a burstiness factor (where a measure of burstiness is, for example, the peak to mean ratio of the transmission rate as well as the duration of the peak transmissions). This first algorithm is used at the receive side of the access node 30. Each of the packets received from the access line 29 includes information in a header for identifying the virtual circuit connection to which the packet belongs. Accordingly the various packets are stored in registers and are identified with specific virtual circuits.

Information from the headers of packets, being transmitted by the terminal equipment 21 and being received by the access node 30, is applied to a bandwidth monitoring and packet marking circuit 80 in FIG. 1.

Figure 2:
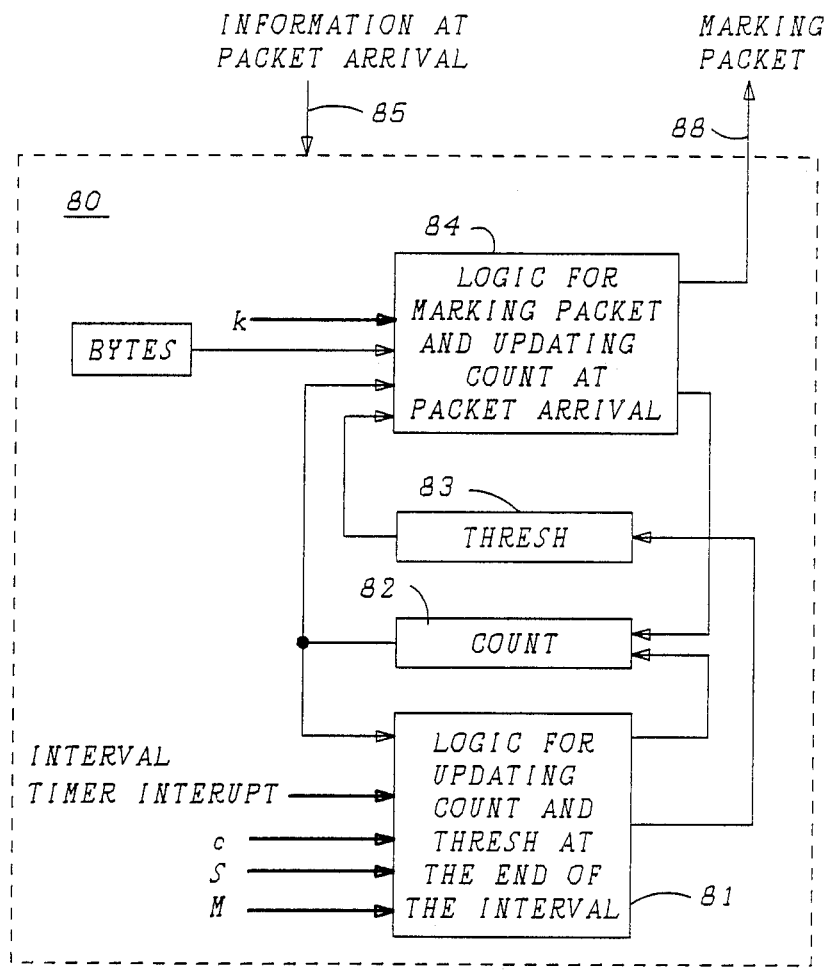
FIG. 2 is a block diagram of circuitry arranged for monitoring the rate of transmission of a customer and for marking that customer's packets.

Referring now to FIG. 2, there is a block diagram of the circuit 80 which performs the proposed bandwidth monitoring and packet marking functions on a per customer basis. Only information from packets, identified as originating from the terminal 21 of FIG. 1 and transmitted through the heavily weighted line linking to the terminal 67, is monitored by the algorithm. The circuit 80 is time shared for performing the same functions with respect to other virtual connections, but all of the monitoring and marking is done separately with respect to individual virtual connections.

The monitoring is accomplished by an algorithm which determines whether or not the individual customer at terminal 21 is transmitting at an excessive rate (a rate greater than the subscribed rate) over the virtual circuit extending to the terminal 67.

When the illustrated virtual connection is set up, the customer terminal equipment 21 and the network 20 negotiate for a desired bandwidth allocation relating to the virtual connection. The bandwidth allocation will be called the selected, or subscribed, transmission rate. Information transmissions which exceed, or are greater than, the subscribed transmission rate are referred to as excessive rates.

A processor in the access node 30 translates the subscribed transmission rate into the long-term threshold M, a short-term threshold S and a decrement constant c. The long-term threshold M is chosen to accommodate the largest burst size allowed by the subscribed transmission rate, and the short-term threshold S is determined by the maximum instantaneous rate allowed. The decrement constant c relates to the guaranteed average throughput of unmarked packets. These are initializing parameters that are applied to a logic circuit 81 when the virtual connection is established, as shown in FIG. 2, for updating values of COUNT and THRESH at the end of an interval. They are used subsequently in the bandwidth monitoring and packet marking circuit 80. Also initially the value of COUNT in an accumulator 82 is set to zero and an active threshold value THRESH is set equal to S in a register 83. Further, in initialization, a parameter k, which is a weighting factor related to the number of packets per interval, is applied to a logic circuit 84 which produces a signal for marking a packet being transmitted at an excessive transmission rate.

Figure 5:
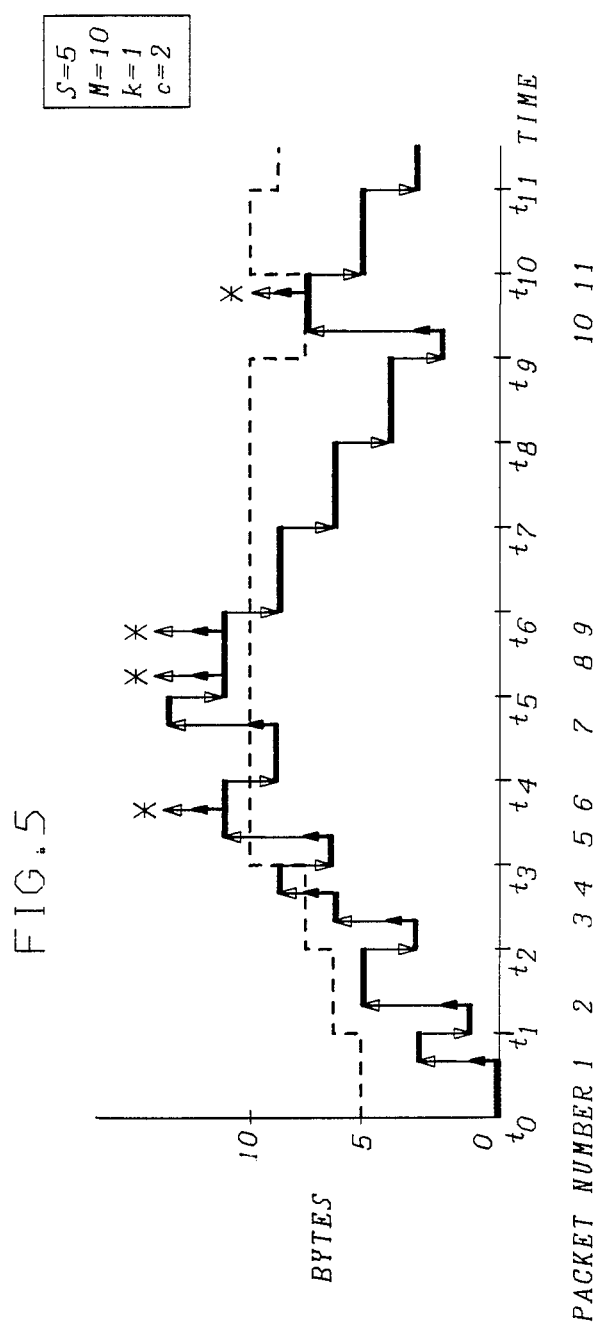
FIG. 5 is a graphic illustration of the actions of the algorithms shown in FIGS. 3 and 4 for a sequence of packets from a customer.

During each interval, as shown in FIGS. 2 and 5, the number of bytes contained in each arriving packet is input by way of a lead 85 to the register storing BYTES to be applied to the logic circuit 84. Circuit 84 decides whether or not the specific packet should be marked as being transmitted at an excessive transmission rate. If the packet is to be marked, a marking signal is generated on the lead 88 for inserting a marking signal into the packet header for identifying the packet as one being transmitted at an excessive transmission rate. If the packet is within the limits of the subscribed transmission rate, no marking signal is generated or inserted into the header of the packet.

There are three alternative packet marking algorithms to be described herein by way of illustrations. Others can be used as well.

Parameters Used in the Algorithms (A) and (B):

I—interval between successive decrements to the value of COUNT in the accumulator; this is a fixed interval for each virtual circuit being monitored and may differ among the virtual circuits; a typical value for I could be in the 10–500 msec range.

k—a parameter by which the value of COUNT in the accumulator is to be incremented for each packet sent from the customer's terminal in addition to the value of BYTES for the packet; the parameter k represents a byte penalty per packet in guaranteed throughput that provides network protection from excessive minimal-sized packets that might otherwise stress real time resources; a typical value for the parameter k is a number between 0 and 1000; a value of the parameter k equal to zero would be used when processor real time is not a concern.

c—a decrement constant relating to the customer's selected throughput of bytes per interval which will avoid packets being marked for possibly being dropped; an amount by which the value of COUNT in the accumulator is to be decremented during each interval; the number of a customer's bytes per interval (subscribed transmission rate) that will guarantee all transmitted packets are unmarked.

S—a short-term or instantaneous threshold on throughput during each interval which, if exceeded, will cause packets to be marked.

M—a long-term bandwidth threshold related to allowable "burst" size.

BYTES—the number of bytes in a packet being received, from a customer's terminal, by an access node.

COUNT—the value in the accumulator.

THRESH—a variable threshold.

Bandwidth Monitoring and Packet Marking -Algorithm (A)

Figure 3:
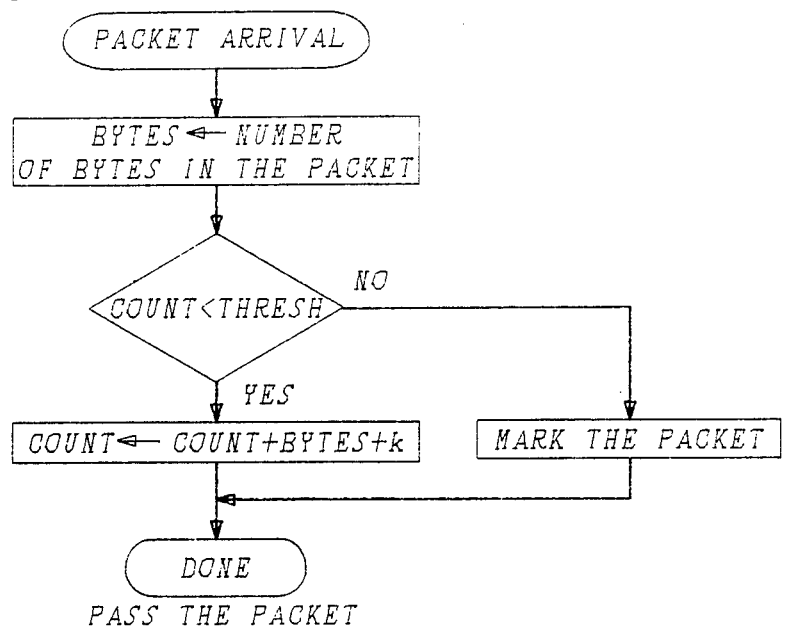
FIG. 3 shows a flow chart of an algorithm for monitoring the rate of transmission of a customer and for marking the customer's packets when the rate of transmission is excessive.

One of those algorithms, Algorithm (A), is shown in FIG. 3 with a graphic example thereof illustrated in FIG. 5.

Initialization for the Algorithm (A):
1. Set the accumulator variable COUNT to 0.
2. Set the threshold variable THRESH to S.

Steps in the Algorithm (A):
1. During each interval, upon receipt of each packet from the customer's terminal (FIG. 3):
 a. Set the byte count variable BYTES to the number of bytes in the packet.
 b. Compare the value of COUNT with the value of THRESH and take the following actions: IF COUNT<THRESH, then pass the packet on unmarked and replace the value of COUNT by COUNT+BYTES+k. Otherwise, if COUNT≧THRESH, then mark the packet, pass it on, and keep the same COUNT.
2. At the end of every interval (FIG. 4):
 a. Replace the value of COUNT by COUNT-c or 0, whichever is larger.
 b. Set THRESH to COUNT+S or M, whichever is smaller.

In FIG. 5, the vertical axis presents the value in bytes for the parameter k, the value of BYTES for the current packet, the value of the short-term threshold S and the value of the long-term threshold M, the value of the threshold variable THRESH, and the decrement constant c. The horizontal axis is time-divided by equal intervals I. Interval I is the duration between two instants of time, such as the instants $t_0$ and $t_1$. Also along the horizontal axis there is a series of numbers, each of which identifies a specific arriving packet.

Parameter k is shown in FIG. 5 as upward-directed arrows with solid arrowheads. It is a constant value for all packets of a virtual connection with the value typically in the range 0–1000. According to the algorithms, COUNT is incremented by the parameter k every time a packet arrives.

The value BYTES is represented in FIG. 5 by upwardly directed arrows with open arrowheads and various values for the several arriving packets. According to the algorithm, COUNT is incremented by BYTES every time a packet arrives, except when the packet is to be marked.

The accumulated values of COUNT are shown in FIG. 5 as heavy horizontal line segments.

The values of THRESH are shown in FIG. 5 as a light dotted line.

When the packet arrives, COUNT is compared with THRESH. If COUNT is less than THRESH, the packet is not marked and COUNT is incremented. If COUNT is equal to or greater than THRESH, the packet is marked and COUNT is not incremented.

Stars are positioned above the lines (representing the parameter k and BYTES) of packets which are to be marked because those packets are determined to be transmitted at an excessive transmission rate.

The decrement constant c is shown in FIG. 5 by downwardly directed open headed arrows, which are of constant value and occur at the end of each interval I except when COUNT would be decremented below zero.

Figure 4:
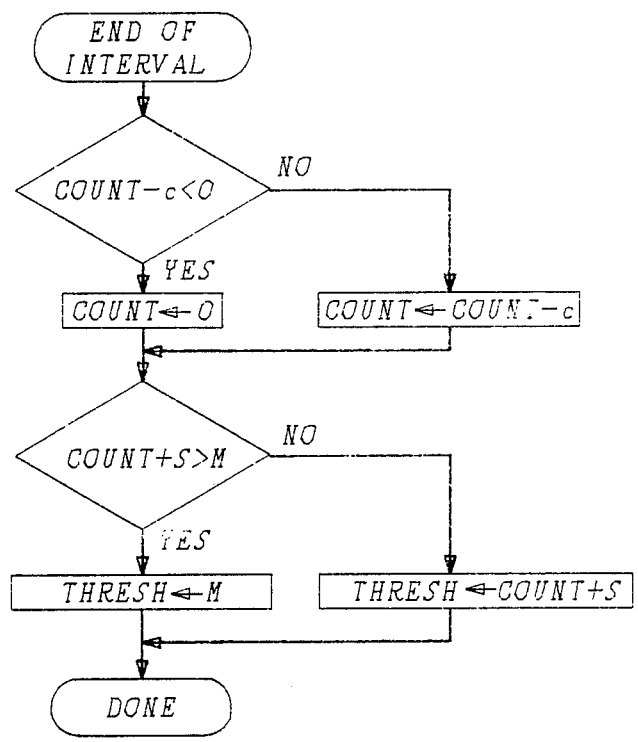
FIG. 4 presents a flow chart of an algorithm for periodically adjusting a counter used in monitoring the rate of transmission of a customer and for determining a dynamic threshold relating to a customer's selected rate of transmission.

Also in the algorithm of FIG. 4, the sum of COUNT plus the value of S is compared with the value of M. If the sum is greater than M, THRESH is set to M. If the sum is less than or equal to M, THRESH is set to the sum of COUNT plus the value of S.

Once the decision is made to mark the packet or not and the packet header is marked appropriately, the packet proceeds through the access node 20 of FIG. 1 to an output controller before being put into an output buffer associated with the output link, through which the packet is to be transmitted. At that time, the information in the packet header field, reserved for the marking signal, is forwarded to a packet dropping logic circuit 53, associated with node 30 of FIG. 1. A more detailed block diagram of the packet dropping logic circuit 53 is presented in FIG. 6.

Figure 6:
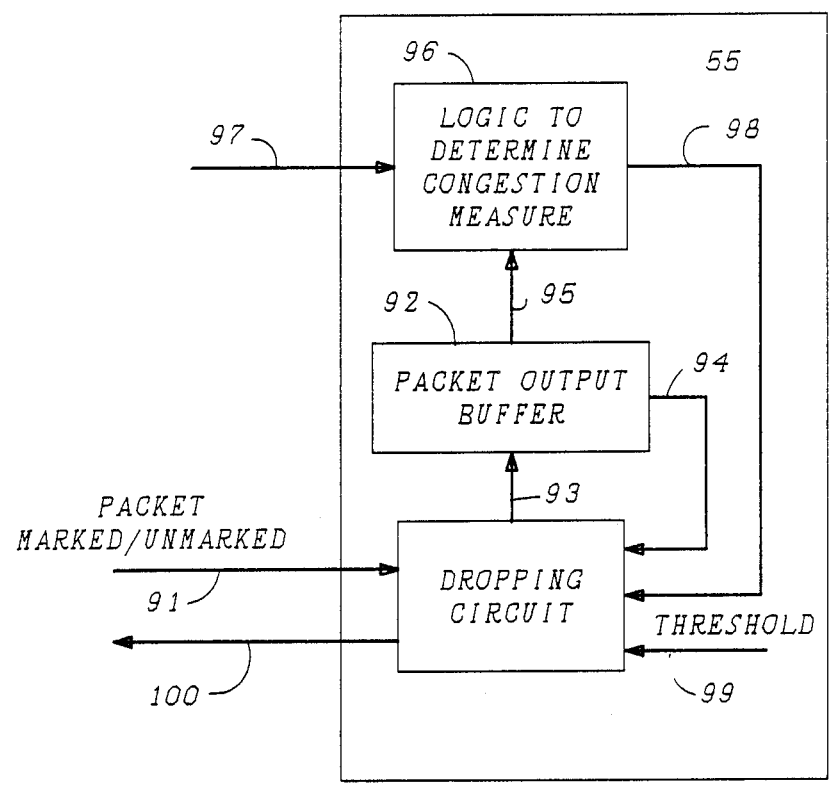
FIG. 6 is a block diagram of circuitry arranged for dropping marked packets within the network.
Figure 7:
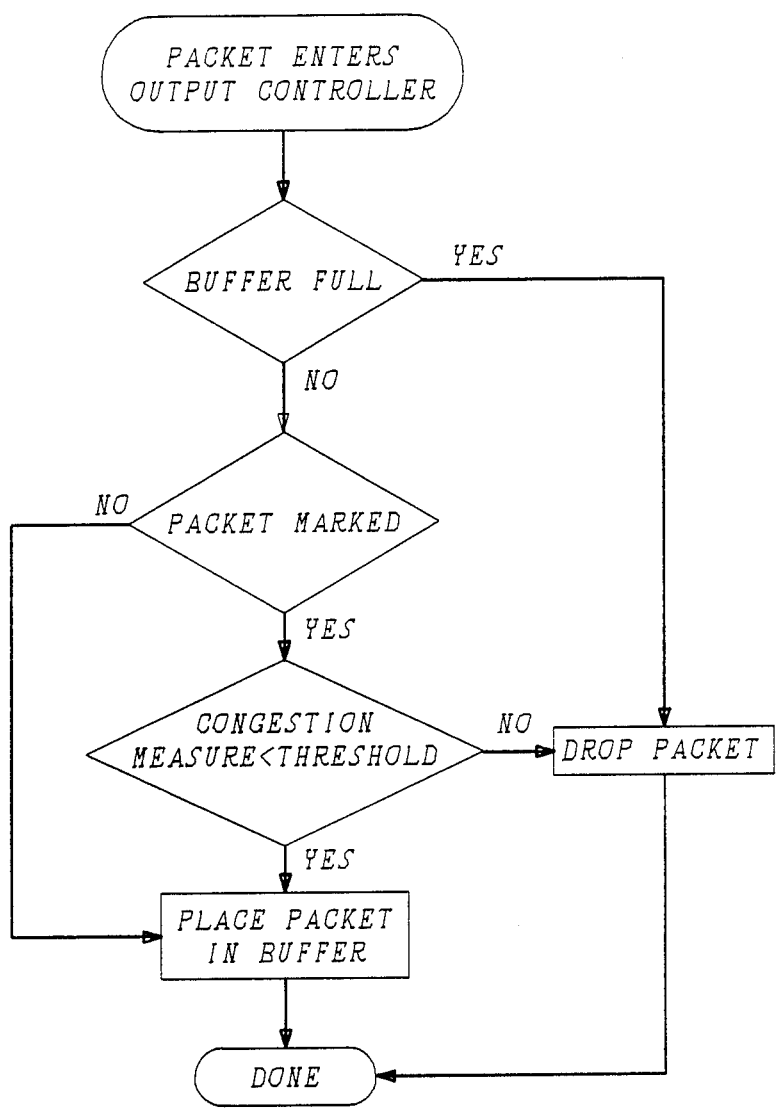
FIG. 7 shows a flow chart of an algorithm for dropping marked packets which encounter congestion within the network.

In FIGS. 6 and 7 there is shown both a block diagram and the algorithm for the logic of determining whether or not to drop the current packet which is about to be applied to the output buffer of the access node 30 or which is about to be applied to the output buffer of any of the switch nodes 40, 50, 60 and 70 of FIG. 1.

It is assumed that traffic is light to moderate in the nodes 30, 40 and 60 along the virtual connection. At the switch node 50, however, traffic is heavy enough to create a congestion condition.

First of all, the packet dropping logic circuits 53 and 54, which are associated with lightly loaded nodes 30 and 40 and are like the logic circuit 55 of FIG. 6, run the algorithm of FIG. 7. Since there is no congestion at these nodes and the output buffers are not full when tested, whether or not the current packet is marked, it is passed to the output buffer of the relevant node for transmission along the virtual connection.

Next the packet traverses the node 50, the congested node. The packet is applied to a dropping circuit 90 in the packet dropping logic circuit 55 by way of a lead 91. Before the packet is placed in its identified packet output buffer 92 by way of a lead 93, that buffer is checked to determine whether or not it is full. If the buffer 92 is full, a signal is forwarded through a lead 94 to the dropping circuit 90. Regardless of whether or not the packet is marked, if the output buffer 92 is full, the packet is dropped. Whether or not the output buffer is full, a measurement of congestion is determined. The number of packets in the packet output buffer 92 is applied by way of a lead 95 to a congestion measuring circuit 96. At the same time, a signal representing the availability of processor real time is applied to the congestion measuring circuit 96 by way of a lead 97.

In response to the signals on the leads 95 and 97, the circuit 96 produces a signal on a lead 98 indicating the amount of congestion that exists at the node 50 of FIG. 1. The congestion signal on the lead 98 and a threshold value applied by way of a lead 99 determine whether or not marked packets are to be dropped by the dropping circuit 90. A signal indicating that a packet should be dropped is transmitted by way of a lead 100 to the switch node 50. When the packet dropping signal occurs, the relevant packet is dropped (if it is a marked packet) or is placed in the output buffer 92 for subsequent transmission through the link 76 of FIG. 1 (if it is an unmarked packet). The aforementioned procedure drops marked packets before placing them in the output buffer. It is called "input dropping" because packet dropping is done at the input to the buffer. Alternatively, one may place all the packets in the output buffer it there is space there and implement "output dropping" for marked packets. That is, when a marked packet in the output buffer finally moves up to the head of the queue and is ready for output, the threshold is checked, and the packet will be dropped or transmitted accordingly.

The congestion measure is a threshold picked to guarantee that a certain quantity of resources are available in the node for passing unmarked packets. A weighted sum of the number of packets residing in the output buffer 92 plus the amount of real time available in the processor is used to measure congestion. The amount of real time is related to the parameter k. When the parameter k is equal to zero, real time is not a concern. Then the number of packets in the output buffer is the only measure of congestion.

Since the packet is dropped at the node 50 when that node is congested and the packet is a marked packet, the congestion is somewhat relieved. The packet being dropped is one previously marked at the access node 30 as a packet being transmitted at an excessive transmission rate. A congestion condition, less critical than a full output buffer, is relieved by dropping only the marked packets. Under such a condition, unmarked packets are passed through to their destination.

Congestion, therefore, is relieved for the most part by dropping the packets of customers who are transmitting at rates which exceed their agreed upon, or assigned, transmission rate. The network, therefore, can adequately serve all subscribers who transmit within their subscribed transmission rate.

Alternative Bandwidth Monitoring and Packet Marking—Algorithm (B)

Figure 8:
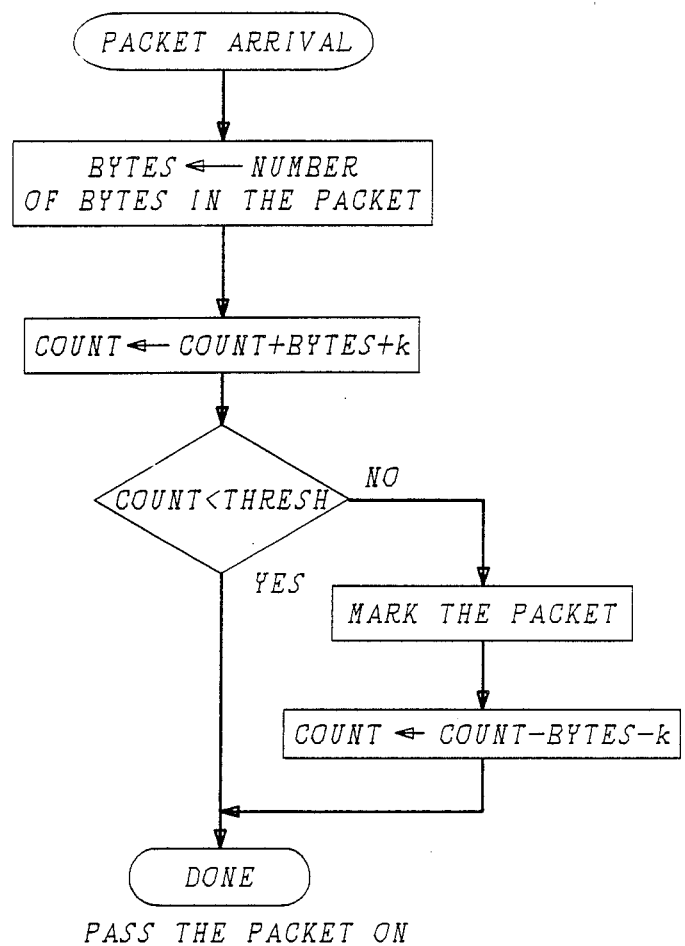
FIG. 8 presents a flow chart of another algorithm for monitoring the rate of transmission of a customer and for marking the customer's packets when the rate of transmission is excessive.

Turning now to FIGS. 8 and 9, there is shown an alternative algorithm for determining which packets are to be marked together with a graphical presentation of how that algorithm operates on a series of received packets. Only the first step (the marking step) is different from the earlier described algorithm explained with respect to FIGS. 3 and 4. Initialization and parameters have the same or a similar meaning except that a new value of COUNT is determined before the value of COUNT is compared with the value of THRESH. The value of BYTES plus the parameter k is added to the value of COUNT before the comparison occurs. Subsequently when the value of COUNT is determined to be less than the value of THRESH, the packet is not marked and is passed along. The existing value of COUNT is retained. If COUNT is equal to or greater than THRESH, the packet is marked and passed along. Then the value of COUNT is decremented by the sum of BYTES plus the parameter k. As with the earlier described packet marking algorithm, Algorithm (A), packets which are marked are considered to be only those being transmitted at an excessive transmission rate.

Initialization for the Algorithm (B):
1. Set the counter variable COUNT to 0.
2. Set the threshold variable THRESH to S.

Steps in the Algorithm (B):
1. During each interval upon receipt of each packet from the customer's terminal (FIG. 8):
   a. Set the byte count variable BYTES to the number of bytes in the packet.
   b. Replace the value of COUNT by COUNT+BYTES+k.
   c. Compare the value of COUNT with the value of THRESH and take the following actions: If COUNT<THRESH, then pass the packet on unmarked. Otherwise, if COUNT≧THRESH, then mark the packet, pass it on, and replace the value of COUNT by the value of COUNT-BYTES-k.
2. At the end of every interval I (FIG. 4):
   a. Replace the value of COUNT by COUNT-c or 0, whichever is larger.
   b. Set THRESH to COUNT+S or M, whichever is smaller.

FIG. 9 shows the result of the series of packets being monitored by the algorithm of FIG. 8. Stars positioned above the lines, representing the parameter k and BYTES for the packets, indicate that those packets are to be marked as excessive transmission rate packets.

Special Service Packet Marking

A special new service can be offered to customers. The new service offering is based on the fact that the network is arranged for dropping marked packets wherever and whenever the marked packets encounter a congestion condition or a full buffer condition. This new service is a low-cost, or economic rate, service.

By subscribing to, or choosing, the economic rate service, the customer assumes a risk that transmitted messages will not be delivered to their destination if they encounter congestion. The operating equipment (either at the customer's terminal or at the access node) is arranged to mark every packet transmitted by the economic rate service customer. Thereafter, as the marked packets proceed through the packet switching network, they are treated like other marked packets. If these marked economic rate service packets traverse a point of congestion or arrive at a full buffer in the network, the packets are dropped. Since all of the economic rate packets are marked, there is a high probability that the message will not be delivered during busy traffic conditions.

During hours of light traffic, however, there is a high probability that there is no congestion nor full buffers. At such times, the message is likely to traverse the network successfully on the first try.

This economic rate service will benefit both the operating communications company and the customer. The customer benefits from the low rate charges. The operating company benefits because customers of this service will tend to transmit economic rate service messages during slow traffic times when much of the company's equipment is idle and much space capacity is available.

Congestion Control

The approach adopted in this invention offers the following advantages over existing techniques for controlling congestion in a packet switching system. First, it affords customers both a guaranteed level of information throughput as well as the opportunity to avail themselves of excess capacity that is likely to exist in the network (depending on the instantaneous level of network congestion) to realize information throughputs beyond their guaranteed levels. This provides customers flexibility in trading off factors such as guaranteed and expected levels of throughput, integrity of information transport through the network, and the associated costs paid to the network provider for different grades of service.

Second, the approach affords the network provider greater flexibility in the provisioning of key network resources to meet the demands of customers, in that the network resources can be provisioned to meet the total demands due to the guaranteed average throughputs of all customers (with a high level of certainty) rather than a statistically-predicted peak total demand of all customers. This lessens the conservatism required in network resource provisioning and allows a higher average level of network resource utilization.

Finally, the congestion control, as illustrated in FIGS. 1-9, is a distributed control that employs the monitoring and marking of packets at access nodes and the dropping of marked packets at any network node that may be experiencing congestion. The control is completely decoupled from actions that may be adopted by customers at the end terminal equipments. Distribution of the control through the network eliminates the need for very low-delay signaling mechanisms between network nodes that would otherwise be needed if excessive rate packets were to be dropped at access nodes. The decoupling of the control from terminal actions eliminates the dependence of the integrity of the control scheme on terminal actions, as is the case with some other control schemes. The distribution of control provides a robustness to the control and an ensured protection of both the network and well-behaved customers from other customers who abusively send packets at excessive transmission rates.

The foregoing describes both apparatus and methods for marking packets being transmitted at an excessive transmission rate when received at an access node, or being transmitted from a special customer, and for dropping marked packets at any node in the network when a congestion condition exists. The apparatus and methods described herein together with other apparatus and methods made obvious in view thereof are considered to be within the scope of the appended claims.

What is claimed is:

1. A method for dropping a marked data packet to be transmitted from a switch node in a packet switching network, the method comprising the steps of:
   a. preparing to transmit the data packet;
   b. determining whether or not the data packet is marked;
   c. evaluating congestion at the output of the switch node;
   d. determining whether or not the congestion is at a predetermined value; and
   e. if the data packet is marked and the congestion is at the predetermined value, dropping the data packet before it is transmitted.

2. A method for dropping a marked data packet, in accordance with claim 1, and comprising the further steps of:
   f. if the data packet is unmarked, passing it to the output;
   g. multiplexing the unmarked data packet with other data packets; and
   h. transmitting the multiplexed unmarked data packet and other data packets through a link or terminal line.

3. A method for dropping a marked data packet to be transmitted from a switch node in a packet switching network, the method comprising the steps of:
   a. segregating data packets transmitted by one customer;
   b. marking that one customer's data packets being transmitted;
   c. preparing to transmit one of the customer's data packets interposed among other data packets;
   d. determining whether or not the data packet to be transmitted is marked;
   e. evaluating congestion at the output of the switch node;
   f. determining whether or not congestion at the switch node is at or above a predetermined value; and
   g. if the data packet is marked and the congestion is at or above the predetermined value, dropping the data packet.

4. A method for dropping a marked packet to be transmitted at an excessive rate from a switch node in a packet switching network, the method comprising the steps of:
   a. preparing to transmit the data packet;
   b. determining whether or not the data packet is marked as a data packet being transmitted at an excessive rate;
   c. evaluating congestion at the output of the switch node;
   d. determining whether or not the congestion is at a predetermined value; and
   e. if the data packet is marked and the congestion is at the predetermined value, dropping the data packet.

5. A packet switching node with a plurality of receive ports; the node comprising
   a plurality of channels, each channel interconnected with a different one of the receive ports, for transmitting sequentially packets of data, each packet containing at least one marking bit which may be enabled;
   means, responsive to a measurement of the congestion of the packet switching node, for generating a signal indicating the amount of congestion in the packet switching node; and means, responsive to the generated congestion signal and a threshold value, for dropping any packet of data containing an enabled marking bit.

6. A method for dropping a data packet which may be marked at a first switch node and is to be transmitted from a second switch node in a packet switching network, the method comprising the steps of:
   a. preparing to transmit the data packet from the second switch node;
   b. determining whether or not the data packet is marked;
   c. evaluating congestion at an output of the second switch node;
   d. determining whether or not the congestion is at a predetermined value; and
   e. if the data packet was marked at the first switch node and the congestion is at the predetermined value, dropping the data packet before it is transmitted from the output of the second switch node.

7. A method for dropping a data packet, in accordance with claim 6, and comprising the further steps of:
   f. if the data packet is unmarked, passing it to the output of the second switch node;
   g. multiplexing the unmarked data packet with other data packets; and
   h. transmitting the multiplexed unmarked data packets and other data packets from the output of the second switch node through a link or terminal line.

8. A method for dropping a data packet which may be marked at a first switch node and is to be transmitted from a second switch node in a packet switching network, the method comprising the steps of:
   a. segregating data packets transmitted from the first switch node by one customer;
   b. marking that one customer's data packets before being transmitted from the first switch node;
   c. preparing to transmit one of the customer's data packets from the second switch node;
   d. determining whether or not the one data packet is marked;
   e. evaluating congestion at an output of the second switch node;
   f. determining whether or not congestion at the output of the second switch node is at or above a predetermined value; and
   g. if the one data packet is marked and the congestion is at or above the predetermined value, dropping the one data packet before it is transmitted from the output of the second switch node.

9. A first packet switching node with a plurality of receive ports, from local access lines and a second packet switching node, the first packet switching node comprising;
   a plurality of channels, each channel from the second packet switching node interconnected with a different one of the receive ports, for transmitting packets of data, each packet containing a marking bit which may be enabled at the second packet switching node;
   means, responsive to a measurement of congestion in the first packet switching node, for generating a signal indicating the amount of congestion in the first packet switching node; and
   means, responsive to the generated congestion signal and a threshold value, for dropping any packet of data containing the enabled marking bit before the packet is transmitted from the first packet switching node.

10. A method for dropping a data packet to be transmitted from a switch node in a packet switching network, the method comprising the steps of:
    a. preparing to transmit the data packet;
    b. determining whether or not the data packet is marked as being transmitted at an excessive rate;
    c. evaluating congestion at the switch node;
    d. determining whether or not the congestion is at or above a predetermined value; and
    e. if the data packet is marked as being transmitted at an excessive rate and the congestion is at or above the predetermined value, dropping the data packet before it is transmitted from the switch node.

11. A method for dropping a data packet, in accordance with claim 10, and comprising the further steps of:
    f. if the data packet is unmarked, passing it to an output of the switch node;
    g. multiplexing the unmarked data packet with other data packets; and
    h. transmitting the multiplexed unmarked data packet and other data packets from the switch node through a link or terminal line.

12. A method for dropping a data packet to be transmitted from a switch node in a packet switching network, the method comprising the steps of:
    a. segregating data packets transmitted by one customer into the network;
    b. marking that one customer's data packets as being transmitted into the network at an excessive rate;
    c. preparing to transmit one of that customer's data packets;
    d. determining whether or not the one data packet is marked;
    e. evaluating congestion at an output of the switch node;
    f. determining whether or not congestion at the switch node is at or above a predetermined value; and
    g. if the one data packet is marked as being transmitted at an excessive rate and the congestion at the switch node is at or above the predetermined value, dropping the data packet.

13. A packet switching node with a plurality of receive ports; the switching node comprising
    a plurality of channels, each channel interconnected with a different one of the receive ports, for transmitting packets of data to the switching node, each packet received by at least one receive port containing a marking bit which may be enabled to indicate the packet was transmitted at an excessive rate;
    means, responsive to a measurement of congestion in the packet switching node, for generating a signal indicating the amount of congestion in the packet switching node; and
    means, responsive to the generated congestion signal and a threshold value, for dropping any packet of data containing an enabled marking bit.

14. A method for dropping a data packet to be transmitted from a switch node in a packet switching network, the method comprising the steps of:
    a. preparing to transmit the data packet;
    b. determining whether or not the data packet is marked as a special service packet;
    c. evaluating congestion at the switch node;
    d. determining whether or not the congestion is at or above a predetermined value; and e. if the data packet is marked as being a special service packet and the congestion is at or above the predetermined value, dropping the data packet before it is transmitted from the switch node.

15. A method for dropping a data packet, in accordance with claim 14, and comprising the further steps of:
 f. if the data packet is unmarked, passing it to an output;
 g. multiplexing the unmarked data packet with other data packets; and
 h. transmitting the multiplexed unmarked data packet and other data packets from the switch node through a link or terminal line.

16. A method for dropping a data packet to be transmitted from a switch node in a packet switching network, the method comprising the steps of:
 a. segregating data packets transmitted by one customer subscribing to a special service;
 b. marking that one customer's data packets as being transmitted into the network as a special service;
 c. preparing to transmit one of the customer's data packets from the switch node;
 d. determining whether or not the one data packet is marked;
 e. evaluating congestion at an output of the switch node;
 f. determining whether or not congestion at the switch node is at or above a predetermined value; and
 g. if the data packet is marked and the congestion at the switch node is at or above the predetermined value, dropping the data packet.

17. A packet switching node with a plurality of receive ports; the switching node comprising
 a plurality of channels, each channel interconnected with a different one of the receive ports, for transmitting packets of data to the switching node, each packet received by at least one receive port containing a marking bit enabled to indicate the packet was transmitted as a special service packet;
 means, responsive to a measurement of congestion in the packet switching node, for generating a signal indicating the amount of congestion in the packet switching node; and
 means, responsive to the generated congestion signal and a threshold value, for dropping any packet of data containing the enabled marking bit.

18. A method for dropping a data packet to be transmitted from a switch node in a packet switching network, the method comprising the steps of:
 a. preparing to transmit the data packet;
 b. determining whether or not the data packet is marked by a single bit;
 c. evaluating congestion at the switch node;
 d. determining whether or not the congestion is at or above a predetermined value; and
 e. if the data packet is marked by the single bit and the congestion is at or above the predetermined value, dropping the data packet before it is transmitted from the switch node.

19. A method for dropping a data packet, in accordance with claim 18, and comprising the further steps of:
 f. if the data packet is unmarked, passing it to an output;
 g. multiplexing the unmarked data packet with other data packets; and
 h. transmitting the multiplexed unmarked data packet and other data packets from the switch node through a link or terminal line.

20. A method for dropping a data packet to be transmitted from a switch node in a packet switching network, the method comprising the steps of:
 a. segregating data packets transmitted by one customer;
 b. marking with a single bit that one customer's data packets being transmitted;
 c. preparing to transmit one of the customer's data packets from the switch node;
 d. determining whether or not the one data packet is marked with the single bit;
 e. evaluating congestion at an output of the switch node;
 f. determining whether or not congestion at the node is at or above a predetermined value; and
 g. if the one data packet is marked with the single bit and the congestion is at or above the predetermined value, dropping the one data packet.

21. A packet switching node with a plurality of receive ports; the switching node comprising
 a plurality of channels, each channel interconnected with a different one of the receive ports, for transmitting packets of data to the switching node, each packet received by at least one receive port containing a single marking bit;
 means, responsive to a measurement of the congestion of the packet switching node, for generating a signal indicating the amount of congestion in the packet switching node; and
 means, responsive to the generated congestion signal and a threshold value, for dropping any packet of data containing the single marking bit.

* * * * *